(12) United States Patent
Mate et al.

(10) Patent No.: US 11,445,099 B2
(45) Date of Patent: Sep. 13, 2022

(54) MULTI-CAMERA DEVICE

(71) Applicant: NOKIA TECHNOLOGIES OY, Espoo (FI)

(72) Inventors: Sujeet Shyamsundar Mate, Tampere (FI); Arto Lehtiniemi, Lempäälä (FI); Antti Eronen, Tampere (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/769,706

(22) PCT Filed: Dec. 17, 2018

(86) PCT No.: PCT/IB2018/060190
§ 371 (c)(1),
(2) Date: Jun. 4, 2020

(87) PCT Pub. No.: WO2019/123211
PCT Pub. Date: Jun. 27, 2019

(65) Prior Publication Data
US 2020/0374436 A1 Nov. 26, 2020

(30) Foreign Application Priority Data

Dec. 20, 2017 (EP) .................................. 17208719

(51) Int. Cl.
*H04N 5/225* (2006.01)
*G06T 7/292* (2017.01)
(Continued)

(52) U.S. Cl.
CPC ........... *H04N 5/2258* (2013.01); *G06T 7/292* (2017.01); *G06V 10/235* (2022.01);
(Continued)

(58) Field of Classification Search
CPC ............ H04N 5/2258; H04N 5/23229; H04N 5/23293; H04N 5/247; H04N 5/232935;
(Continued)

(56) References Cited

U.S. PATENT DOCUMENTS

| 2012/0120186 A1* | 5/2012 | Diaz | H04N 5/77 348/36 |
| 2014/0267645 A1* | 9/2014 | Wexler | G06F 3/011 348/62 |

(Continued)

FOREIGN PATENT DOCUMENTS

| CN | 106020437 A | 10/2016 |
| EP | 2 838 253 A1 | 2/2015 |

OTHER PUBLICATIONS

International Search Report and Written Opinion dated Mar. 21, 2019 corresponding to International Patent Application No. PCT/IB2018/060190.

(Continued)

*Primary Examiner* — Nasim N Nirjhar
(74) *Attorney, Agent, or Firm* — Squire Patton Boggs (US) LLP

(57) ABSTRACT

A method and apparatus is described comprising: obtaining first input data from a first camera of a multi-camera device; obtaining second input data from a second camera of the multi-camera device (wherein the second camera is orientated in a different direction to the first camera); defining a first region or object of interest for the first camera and/or a second region or object of interest for the second camera; tracking the first region or object of interest and/or the second region or object of interest; generating a first output data based on the first input data; generating a second output
(Continued)

data based on the second input data; and generating a multi-camera output that includes the first and second output data.

19 Claims, 10 Drawing Sheets

(51) Int. Cl.
*H04N 5/232* (2006.01)
*H04N 5/247* (2006.01)
*G06V 10/22* (2022.01)

(52) U.S. Cl.
CPC ..... *H04N 5/23229* (2013.01); *H04N 5/23293* (2013.01); *H04N 5/247* (2013.01)

(58) Field of Classification Search
CPC ......... H04N 5/23299; H04N 5/232945; H04N 2007/145; H04N 7/147; H04N 5/23216; H04N 5/23296; H04N 5/2624; G06T 7/292; G06T 7/33; G06T 2200/32; G06T 2207/10012; G06T 2207/10024; G06T 2207/20221; G06T 3/00; G06K 9/2081
See application file for complete search history.

(56) References Cited

U.S. PATENT DOCUMENTS

| | | | |
|---|---|---|---|
| 2015/0015704 A1* | 1/2015 | Hirasawa | G06T 7/292 348/143 |
| 2017/0023492 A1 | 1/2017 | Olsson et al. | |
| 2017/0094230 A1* | 3/2017 | Inoue | H04N 5/232945 |
| 2017/0244959 A1 | 8/2017 | Ranjeet et al. | |
| 2018/0192001 A1* | 7/2018 | Boyce | H04N 19/46 |

OTHER PUBLICATIONS

Communication pursuant to Article 94(3) EPC dated May 20, 2021 corresponding to European Patent Application No. 17208719.9.
Extended European Search Report dated May 30, 2018 corresponding to European Patent Application No. 17208719.9.
Notification of the First Office Action dated Mar. 31, 2021 corresponding to Chinese Patent Application No. 2018800828066, with English Summary thereof.
Notification of Second Office Action dated Oct. 21, 2021 corresponding to Chinese Patent Application No. 2018800828066, with English Summary thereof.
Third Office Action dated May 7, 2022 corresponding to Chinese Patent Application No. 201880082806.6, with English summary thereof.

* cited by examiner

MULTI-CAMERA DEVICE

FIELD

The present specification relates to capturing content using cameras, for example using cameras of a mobile communication device or similar device.

BACKGROUND

Mobile communication devices including cameras are known. Moreover, it is known to provide such cameras on both the front and rear of a mobile communication device. However, it is difficult to provide good framing for images of both the front and rear cameras, especially when the two cameras are used at the same time.

SUMMARY

In a first aspect, this specification describes a method comprising: obtaining first input data from a first camera of a multi-camera device; obtaining second input data from a second camera of the multi-camera device, wherein the second camera is orientated in a different direction to the first camera; defining a first region or object of interest for the first camera and/or a second region or object of interest for the second camera; tracking the first region or object of interest and/or the second region or object of interest; generating a first output data based on the first input data; generating a second output data based on the second input data; and generating a multi-camera output that includes the first and second output data. The first camera may be a front camera. The second camera may be a rear camera. The first input data may be data from a field of view of the first camera. The second input data may be data from a field of view of the second camera.

The first output data may be data from a viewport of the first camera, wherein the viewport of the first camera is narrower than the field of view of the first camera. Alternatively, or in addition, the second output data may be data from a viewport of the second camera, wherein the viewport of the second camera is narrower than the field of view of the second camera.

The first region or object of interest and/or the second region or object of interest may be defined by a user indication.

Tracking the first region or object of interest may comprise keeping the first region or object of interest within the first output data. Alternatively, or in addition, tracking the second region or object of interest may comprise keeping the second region or object of interest within the second output data.

The method may comprise ceasing to track the first region or object of interest and/or the second region or object of interest when the said region or object of interest moves outside a field of view of the relevant camera. The method may further comprise resuming tracking of the first region or object of interest and/or the second region or object of interest when the said region or object of interest moves back within a field of view of the relevant camera.

The method may further comprise providing an alert when the first region or object of interest and/or the second region or object of interest moves outside a field of view of the relevant camera.

The method may further comprise deselecting the first region or object of interest for the first camera and/or the second region or object of interest for the second camera and ceasing to track the deselected region or object of interest.

The multi-camera output may present the first and second outputs data either side-by-side or one on top of the other.

In a second aspect, this specification describes an apparatus configured to perform any method as described with reference to the first aspect.

In a third aspect, this specification describes computer-readable instructions which, when executed by computing apparatus, cause the computing apparatus to perform any method as described with reference to the first aspect.

In a fourth aspect, this specification describes an apparatus comprising: means for obtaining first input data from a first camera of a multi-camera device; means for obtaining second input data from a second camera of the multi-camera device, wherein the second camera is orientated in a different direction to the first camera; means for defining a first region or object of interest for the first camera and/or a second region or object of interest for the second camera; means for tracking the first region or object of interest and/or the second region or object of interest; means for generating a first output data based on the first input data; means for generating a second output data based on the second input data; and means for generating a multi-camera output that includes the first and second output data. The first input data may be data from a field of view of the first camera. The second input data may be data from a field of view of the second camera. The first output data may be data from a viewport of the first camera, wherein the viewport of the first camera is narrower than the field of view of the first camera. The second output data may be data from a viewport of the second camera, wherein the viewport of the second camera is narrower than the field of view of the second camera. The first camera may be a front camera. The second camera may be a rear camera. The first input data may be data from a field of view of the first camera. The second input data may be data from a field of view of the second camera.

The first output data may be data from a viewport of the first camera, wherein the viewport of the first camera is narrower than the field of view of the first camera. Alternatively, or in addition, the second output data may be data from a viewport of the second camera, wherein the viewport of the second camera is narrower than the field of view of the second camera.

The first region or object of interest and/or the second region or object of interest may be defined by a user indication.

Tracking the first region or object of interest may comprise keeping the first region or object of interest within the first output data. Alternatively, or in addition, tracking the second region or object of interest may comprise keeping the second region or object of interest within the second output data.

The apparatus may comprise means for ceasing to track the first region or object of interest and/or the second region or object of interest when the said region or object of interest moves outside a field of view of the relevant camera. The apparatus may further comprise means for resuming tracking of the first region or object of interest and/or the second region or object of interest when the said region or object of interest moves back within a field of view of the relevant camera.

The apparatus may further comprise means for providing an alert when the first region or object of interest and/or the second region or object of interest moves outside a field of view of the relevant camera.

The apparatus may further comprise means for deselecting the first region or object of interest for the first camera and/or the second region or object of interest for the second camera and ceasing to track the deselected region or object of interest.

The multi-camera output may present the first and second outputs data either side-by-side or one on top of the other.

The said means may comprise: at least one processor; and at least one memory including computer program code, the at least one memory and the computer program configured, with the at least one processor, to cause the performance of the apparatus.

In a fifth aspect, this specification describes an apparatus comprising: at least one processor; and at least one memory including computer program code which, when executed by the at least one processor, causes the apparatus to: obtain first input data from a first camera of a multi-camera device; obtain second input data from a second camera of the multi-camera device, wherein the second camera is orientated in a different direction to the first camera; define a first region or object of interest for the first camera and/or a second region or object of interest for the second camera; track the first region or object of interest and/or the second region or object of interest; generate a first output data based on the first input data; generate a second output data based on the second input data; and generate a multi-camera output that includes the first and second output data. The first input data may be data from a field of view of the first camera and the second input data may be data from a field of view of the second camera. The first output data may be data from a viewport of the first camera (wherein the viewport of the first camera is narrower than the field of view of the first camera) and/or the second output data may be data from a viewport of the second camera (wherein the viewport of the second camera is narrower than the field of view of the second camera). Tracking the first region or object of interest may comprise keeping the first region or object of interest within the first output data and/or tracking the second region or object of interest may comprise keeping the second region or object of interest within the second output data.

In a sixth aspect, this specification describes a computer-readable medium having computer-readable code stored thereon, the computer readable code, when executed by at least one processor, causing performance of: obtaining first input data from a first camera of a multi-camera device; obtaining second input data from a second camera of the multi-camera device, wherein the second camera is orientated in a different direction to the first camera; defining a first region or object of interest for the first camera and/or a second region or object of interest for the second camera; tracking the first region or object of interest and/or the second region or object of interest; generating a first output data based on the first input data; generating a second output data based on the second input data; and generating a multi-camera output that includes the first and second output data. The first input data may be data from a field of view of the first camera and the second input data may be data from a field of view of the second camera. The first output data may be data from a viewport of the first camera (wherein the viewport of the first camera is narrower than the field of view of the first camera) and/or the second output data may be data from a viewport of the second camera (wherein the viewport of the second camera is narrower than the field of view of the second camera). Tracking the first region or object of interest may comprise keeping the first region or object of interest within the first output data and/or tracking the second region or object of interest may comprise keeping the second region or object of interest within the second output data.

In a seventh aspect, this specification describes a computer-readable medium (such as a non-transitory computer readable medium) comprising program instructions stored thereon for performing at least the following: obtaining first input data from a first camera of a multi-camera device, wherein the first input data is data from a field of view of the first camera; obtaining second input data from a second camera of the multi-camera device, wherein the second input data is data from a field of view of the second camera and wherein the second camera is orientated in a different direction to the first camera; defining a first region or object of interest for the first camera and/or a second region or object of interest for the second camera; tracking the first region or object of interest and/or the second region or object of interest; generating a first output data based on the first input data, wherein the first output data is data from a viewport of the first camera; generating a second output data based on the second input data, wherein the second output data is data from a viewport of the second camera; and generating a multi-camera output that includes the first and second output data, wherein: the viewport of the first camera is narrower than the field of view of the first camera and/or the viewport of the second camera is narrower than the field of view of the second camera; and tracking the first region or object of interest comprises keeping the first region or object of interest within the first output data and/or tracking the second region or object of interest comprises keeping the second region or object of interest within the second output data.

BRIEF DESCRIPTION OF THE DRAWINGS

Example embodiments will now be described, by way of non-limiting examples, with reference to the following schematic drawings, in which.

DETAILED DESCRIPTION

Figure 1:
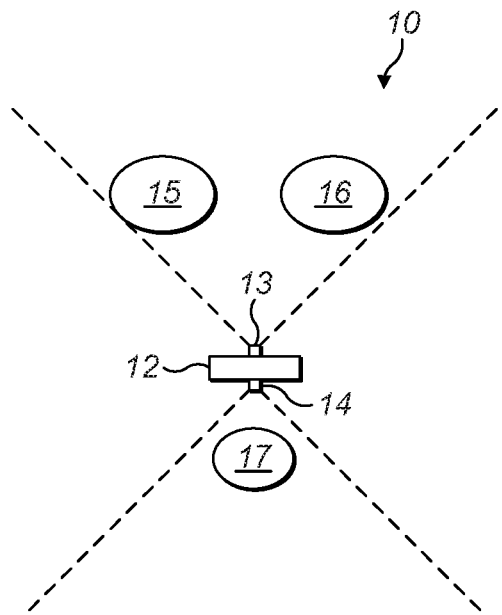
FIG. 1 is a block diagram of a system in accordance with an example embodiment.

FIG. 1 is a block diagram of a system, indicated generally by the reference numeral 10, in accordance with an example embodiment.

The system 10 comprises a user device 12, such as a mobile communication device (e.g. a mobile phone). The user device 12 has a front camera 13 and a rear camera 14 (the cameras may be video cameras and/or still image cameras). A first object 15 and a second object 16 are within a viewport of the front camera 13. A third object 17 is within a viewport of the rear camera 14. The third object 17 may, for example, be the user of the user device 12. The user device 12, having a front camera 13 and rear camera 14, is an example of a multi-camera device. Other examples of multi-camera devices are also possible, such as devices with more than two cameras, or devices with cameras in different locations.

Figure 2:
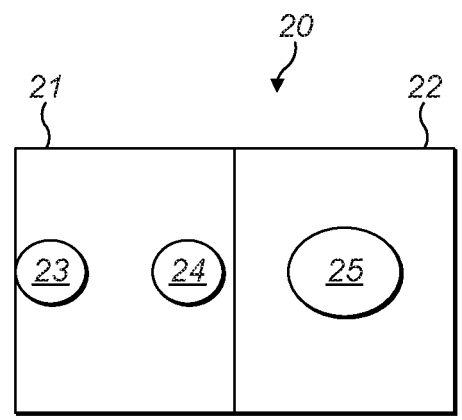
FIG. 2 shows an exemplary view output by the system of FIG. 1.

FIG. 2 shows an exemplary view, indicated generally by the reference numeral 20, output by the user device 12 described above with reference to FIG. 1. The view 20 is a combined view that includes a first view 21 that is provided by the front camera 13 and a second view 22 that is provided by the rear camera 14. As shown in FIG. 2, the combined view 20 displays the first and second views side-by-side. Thus, the view 20 shows the data within the viewports of the cameras 13 and 14. Generally, the first view 21 and the second view 22 are captured simultaneously by the cameras 13 and 14 respectively.

The first view 21 includes a first image 23 and a second image 24. The first image 23 (on the left of the view 21) is a representation of the first object 15. The second image 24 is a representation of the second object 16. In a similar way, the second view 22 includes a third image 25 that is a representation of the third object 17. It will be apparent that the images displayed in the first and second views can be adjusted by moving the user device 12 (and hence moving the cameras 13 and 14).

Figure 3:
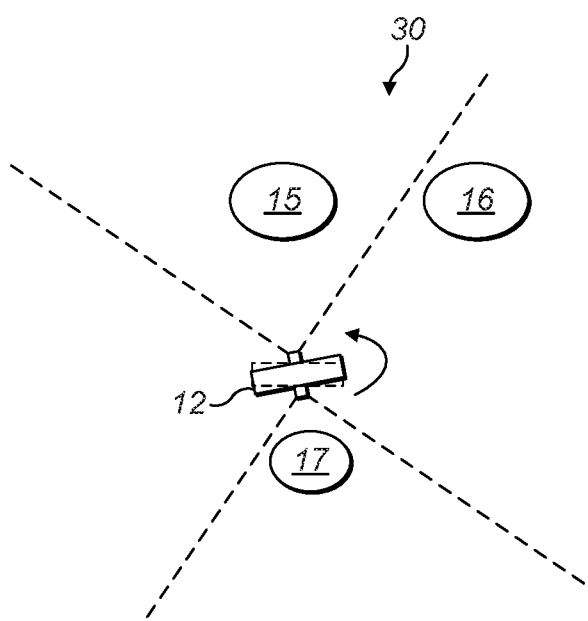
FIG. 3 is a block diagram of a system in accordance with an example embodiment.

FIG. 3 is a block diagram of a system, indicated general by the reference numeral 30, in accordance with an example embodiment.

The system 30 includes the user device 12, first object 15, second object 16 and third object 17 described above. However, in the system 30, the user device 12 has been rotated anti-clockwise relative to the user device position in FIG. 1. The user device 12 may be rotated in this manner in order to frame the first object 15 within the centre of the viewport of the front camera of the user device 12.

Figure 4:
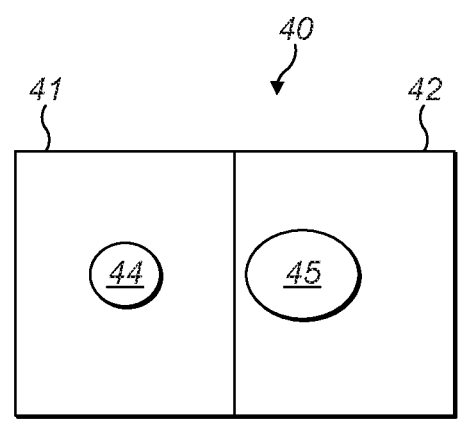
FIG. 4 shows an exemplary view output by the system of FIG. 3.

FIG. 4 shows an exemplary view, indicated generally by the reference numeral 40, output by the system 30. As with the view 20 described above, the view 40 is a combined view that includes a first view 41 that is provided by the front camera of the user device 12 and a second view 42 that is provided by the rear camera of the user device. As with the combined view 20 described above, the combined view 40 displays the first and second views side-by-side and, as noted above, the first view 41 and the second view 42 are generally captured simultaneously.

The first view 41 includes a first image 44 that is a representation of the first object 15. As a result of the rotation of the user device 12, the first image 44 is in the centre of the first view 41 and the second object 16 is no longer visible in the first view 41.

The second view 42 includes an image 45 that is a representation of the third object 17. As a result of the rotation of the user device 12, the image 45 appears on the left of the second view 42 (compared with the central position of the corresponding image in the second view 22 described above).

It is difficult to manipulate the user device 12 in order to frame one or more objects of interest within the viewport of the front camera 13 and at the same time to frame one or more objects of interest within the viewport of the rear camera 14. This is particularly true if any of the objects of interest are moving. Moreover, framing the output of the rear camera 14 can be particularly difficult since that view is typically presented as a mirror image.

By way of example, consider a scenario in which the front camera 13 of the user device 12 is being used to capture video data of two children playing. The children may be the objects 15 and 16 described above. At the same time, the rear camera 14 is being used to capture video data of a parent of the two children. The parent may be the object 17 described above. As the children move, the user device 12 can be moved to keep the children (i.e. the objects 15 and 16) within the viewport of the front camera 12 and therefore displayed in the first view 21 or 41 of the combined view 20 or 40. However, as the user device 12 is moved to keep the children within the viewport, the position of the parent within the viewport of the rear camera 14 will change. Thus, the framing of the rear camera changes as the framing of the front camera changes. The inter-relationship between the framing of the front and rear cameras can be difficult to control. Thus, the use of the system 10 (or 30) for providing combined views (such as the views 20 or 40) can be difficult, particularly for an inexperienced user, and particularly if it is desired to generate images (either still images or video images) without requiring post-processing of such images.

Figure 5:
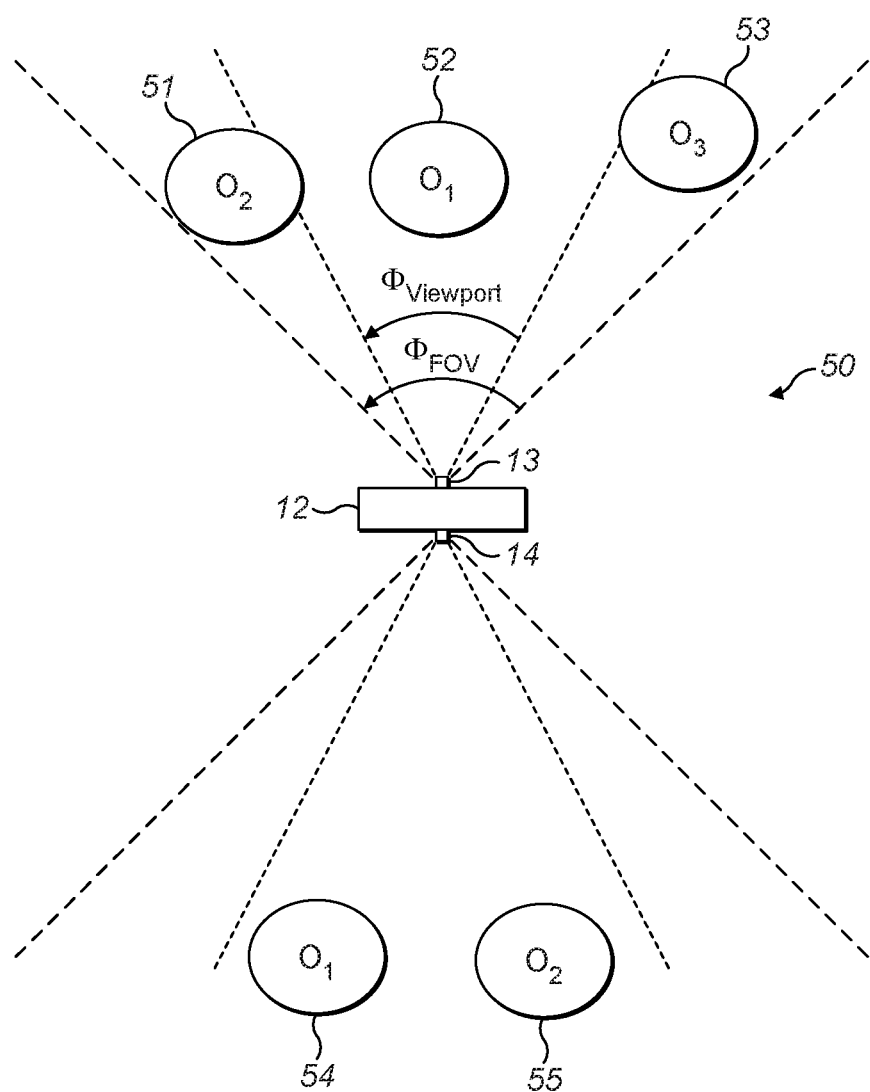
FIG. 5 is a block diagram of a system in accordance with an example embodiment.

FIG. 5 is a block diagram of a system, indicated generally by the reference numeral 50, in accordance with an example embodiment. The system 50 includes the user device 12 described above, the user device 12 including the front camera 13 and the rear camera 14. In addition, the system 50 comprises a first object 51, a second object 52, a third object 53, a fourth object 54 and a fifth object 55.

As indicated in FIG. 5, the front camera 13 has a viewport having an angle $\Phi_{viewport}$. The rear camera 14 has a similar viewport (indicated with dotted lines in FIG. 5). In the arrangements described above with reference to FIGS. 2 and 4, any object within the viewport of a camera was displayed in the combined output.

In addition to the viewport, the front camera 13 has field-of-view having an angle $\Phi_{FOV}$. The rear camera has a similar field of view (again, indicated by dotted lines in FIG. 5). As shown in FIG. 5, the angles of the fields of view ($\Phi_{FOV}$) of the cameras 13 and 14 are wider than the angles of the viewports ($\Phi_{viewport}$) of those cameras. Note that although the viewports of the first and second cameras are similar and the fields of view of the first and second cameras are similar, this does not have to be the case. By way of example, the viewports and fields of view of one camera (e.g. the front camera) could be wider than the corresponding viewports and fields of view of the other camera (e.g. the rear camera.) It should also be noted that, as discussed elsewhere in this document, one or both of the viewports may change their locations within the fields of view of the camera.

Figure 6:
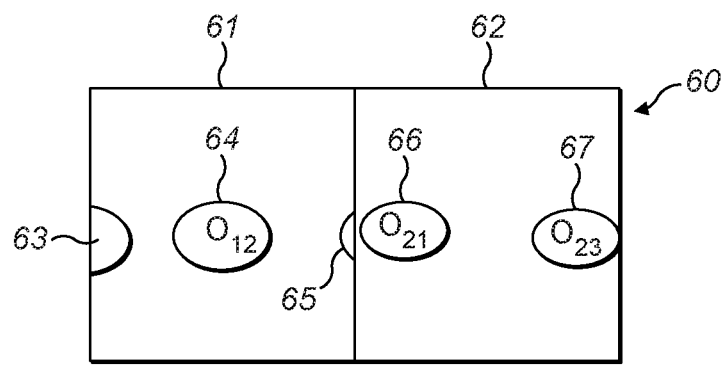
FIG. 6 shows an exemplary view output by the system of FIG. 5.

FIG. 6 shows an exemplary view, indicated generally by the reference numeral 60, output by the system 50. The view 60 is a combined view that includes a first view 61 that is provided by the front camera 13 of the user device 12 of the system 50 and a second view 62 that is provided by the rear camera 14 of the user device. As with the combined views 20 and 40 described above, the combined view 60 displays the first and second views side-by-side. Also, in accordance with the views 20 and 40 described above, the first view 61 shows what is visible within the viewport of the first camera 13 and the second view 62 shows what is visible within the viewport of the second camera 14.

The first view 61 includes a first image 63, a second image 64 and a third image 65. The first image 61 (on the left of the view 61) is a representation of part of the first object 51 (the part that is within the viewport of the front camera 13). The second image 64 is a representation of the second object 52. The third image 65 is a representation of part of the third object 53 (the part that is within the viewport of the front camera 13).

In a similar way, the second view 62 includes a fourth image 66 and a fifth image 67 that are representations of the fourth object 54 and fifth object 55 respectively.

As described further below, data is collected from the fields of view of the front and rear cameras, which fields of view are wider than the viewports. Thus, more data is collected than displayed. This leads to a degree of flexibility, which can be exploited, as described in detail below.

Figure 7:
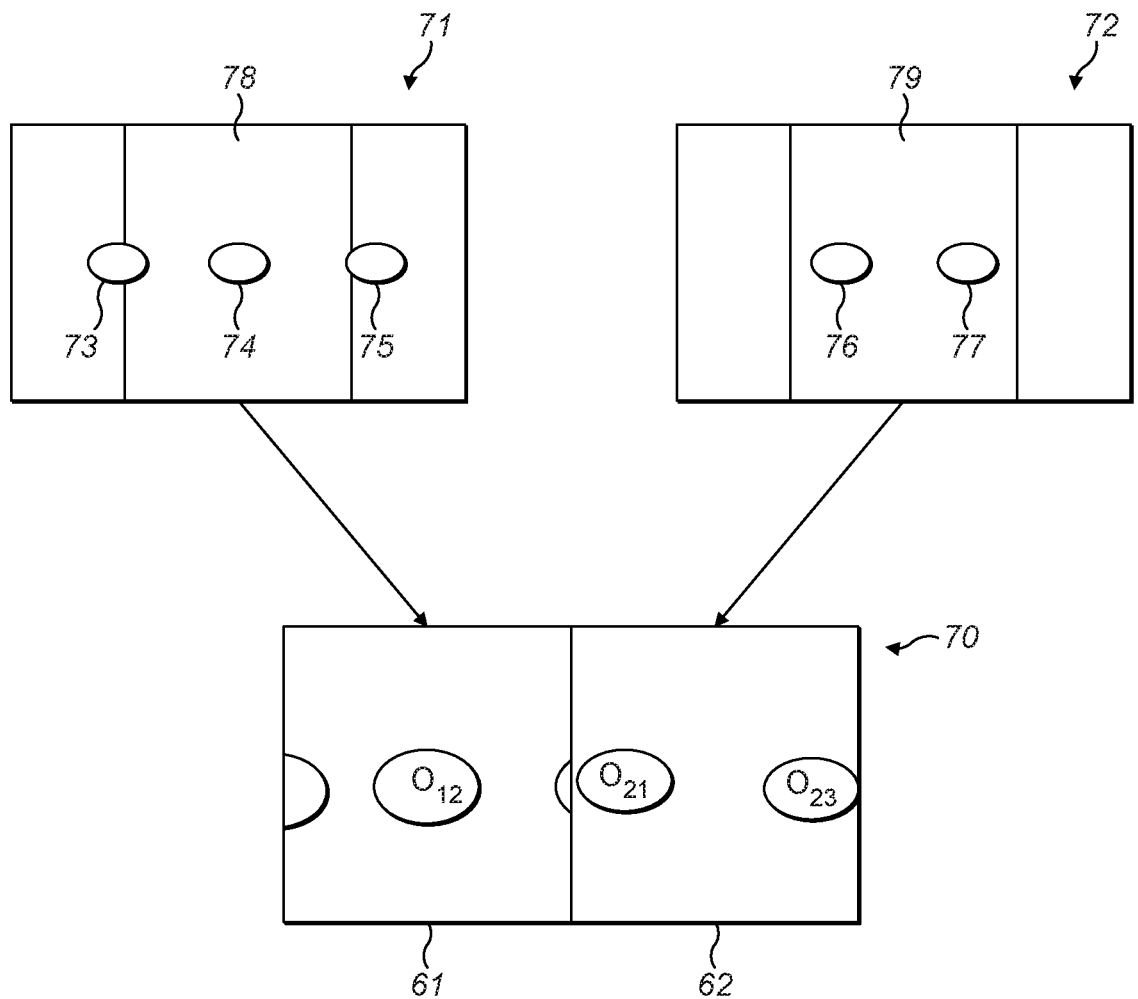
FIG. 7 shows exemplary views generated and output by the system of FIG. 5.

FIG. 7 shows exemplary views, indicated general by the reference numeral 70, output by the system 50. The views 70 include a first view 71 that shows what is visible within the field of view of the first camera 13 and a second view 72 that shows what is visible within the field of view of the second camera 14.

The first view 71 includes a first image 73, a second image 74 and a third image 75 that are representations of the first object 51, second object 52 and third object 53 respectively. Similarly, the second view 72 includes a fourth image 76 and a fifth image 77 that are representations of the fourth object 54 and fifth object 55 respectively.

Thus, the first view 71 shows the first object 51, second object 52 and third object 53, all of which are within the field of view of the first camera. Similarly, the second view 72 shows the fourth object 54 and fifth object 55, both of which are within the field of view of the second camera.

As noted above, the fields of view of the first and second cameras are wider than the respective viewports of the first and second cameras. Accordingly, within the first view 71 is an area, indicated generally by the reference numeral 78, showing what is visible within the viewport of the first camera. Similarly, within the second view 72 is an area, indicated generally by the reference numeral 79, showing what is visible within the viewport of the second camera.

As will be apparent from viewing FIGS. 6 and 7, the first view 61 of the combined views 60 described above is formed from the view 78. Similarly, the second view 62 of the combined views 60 is formed from the view 79. Thus, the first and second cameras 12 and 13 capture more data than is displayed in the combined view 60. This fact can be exploited in some interesting ways, as described further below.

Figure 8:
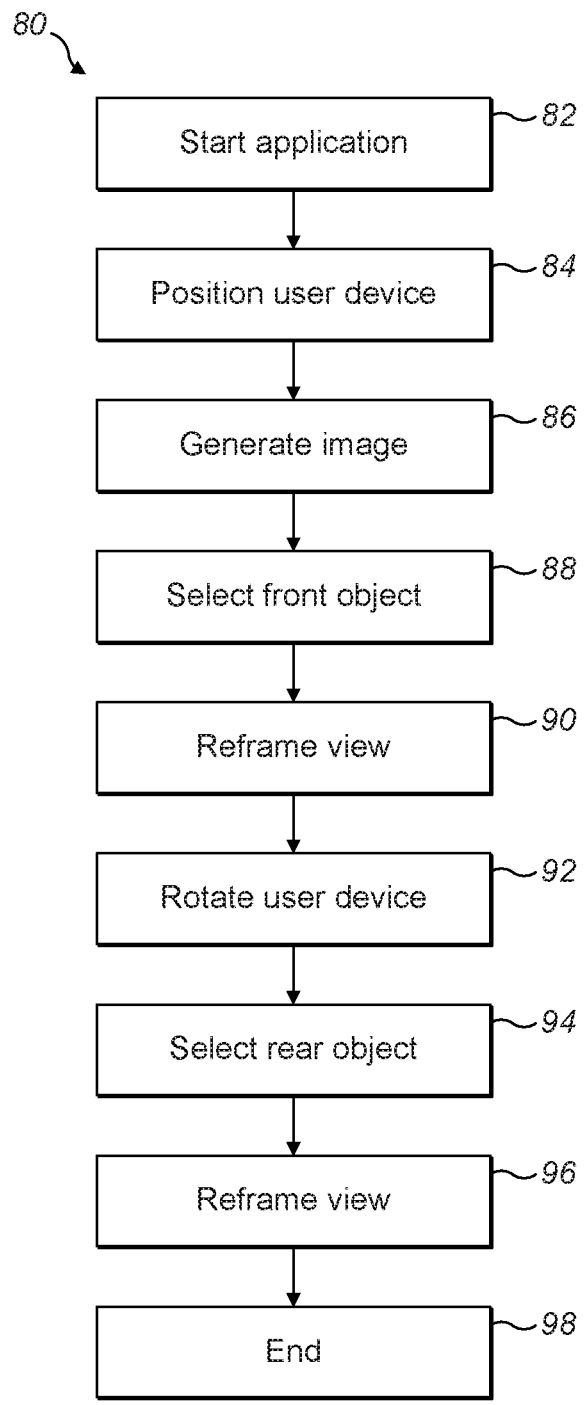
FIG. 8 is a flow chart showing an algorithm in accordance with an example embodiment.

FIG. 8 is a flow chart showing an algorithm, indicated generally by the reference numeral 80, in accordance with an example embodiment. FIGS. 9a to 9d show exemplary outputs of the algorithm 80.

As shown in FIG. 8, the algorithm 80 starts at operation 82. Optionally, at operation 84, the user device 12 is positioned. For example, the user device may be positioned such that one or more desired objects are within the viewport or the field of view of the front camera of the user device. In some embodiments, the operation 84 may be omitted (e.g. if the user device 12 is fixed or if a user does not wish to change the rotational position).

At operation 86, a combined view of the front and rear cameras is generated and displayed. For example, the output 60 described above may be generated and displayed, showing what is visible within the viewports of the front and rear cameras of the user device 12.

Thus, the data obtained from the fields of view of the front and rear cameras may be considered to be "input data" of the algorithm 80 and the data obtained from the viewports of the front and rear cameras may be considered to be "output data" of the algorithm 80, where the output (viewport) data is a subset of the input (fields of view) data).

Figure 9A:
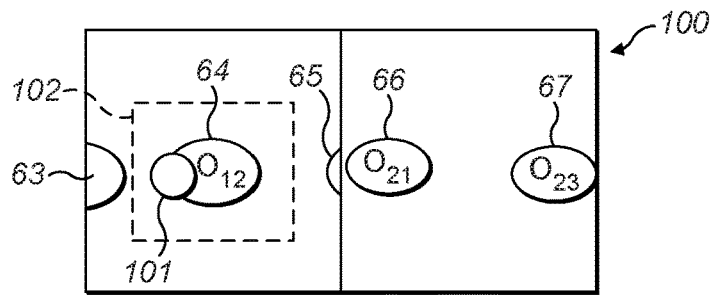
FIGS. 9a to 9d show exemplary outputs of the algorithm of FIG. 8.

At operation 88, a front object or area of interest is selected. FIG. 9a shows an output, indicated generally by the reference numeral 100, showing the first, second, third, fourth and fifth images 63 to 67 described above with reference to FIG. 6. An indication 101 is shown in FIG. 9a showing an object or area of interest. The indication 101 may, for example, be made by a user touching a relevant screen (other options are discussed further below). In response to the indication 101, an area of interest 102 around the second image 64 is highlighted in the output 100. The highlighted area 102 may indicate an area of interest or may indicate that the second image 64 represents an object of interest in the algorithm 80. (It should be noted that whether an object or an area of interest is selected in operation 88 may, in some embodiments, be defined by a user.)

Figure 9B:
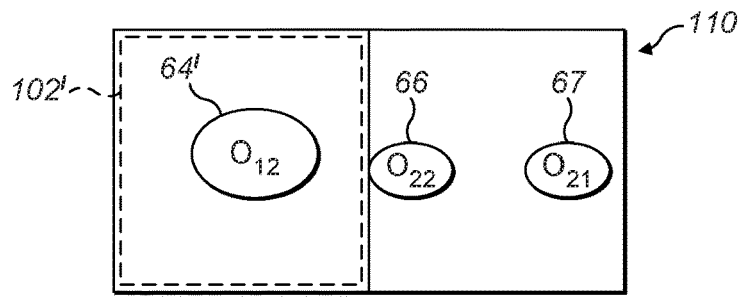

At operation 90, the view is reframed. For example, the view of an area or object of interest selected in operation 88 may be expanded by zooming in on that object or area. By way of example, FIG. 9b shows the combined view, indicated generally by the reference numeral 110, in which the first view has been modified (i.e. reframed) such that it is centred on a zoomed area 102', including a zoomed second image 64'. Note that the first image 63 and the third image 65 are no longer displayed.

At operation 92, the user device is optionally rotated. For example, the user device may be rotated such that one or more desired objects are within the viewport or the field of view of the rear camera of the user device. In some embodiments, the operation 92 may be omitted (e.g. if the user device 12 is fixed or if a user does not wish to change the rotational position). (Indeed, operation 92 is omitted from the examples of FIGS. 9a to 9d.)

Figure 9C:
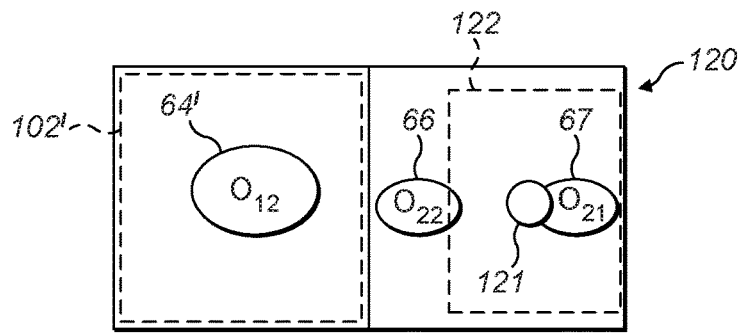

At operation 94, a rear object or area is selected. FIG. 9c shows the combined view, indicated generally by the reference numeral 120 in which an indication 121 is shown, showing an object or area of interest. As with the indication 101 described above, the indication 121 may be made by a user touching a relevant screen. In response to the indication 121, an area of interest 122 around the fifth image 67 is highlighted in the output 120. The highlighted area 122 may indicate an area of interest or may indicate that the fifth image 67 represents an object of interest in the algorithm 80. (It should be noted that whether an object or an area of interest is selected in operation 94 may, in some embodiments, be defined by a user.)

Figure 9D:
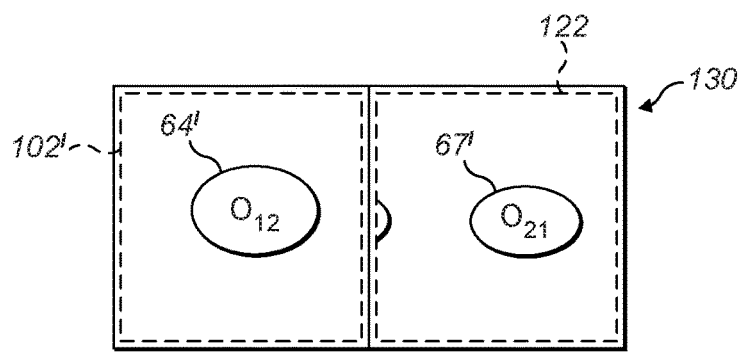

At operation 96, the view is reframed. FIG. 9d shows the combined view, indicated generally by the reference numeral 130, in which the second view has been modified (i.e. reframed) such that it is centred on the zoomed area 122' including the zoomed image 67'. The algorithm then ends at operation 98.

As indicated above, a user may indicate an object or area of interest by touching a display screen. This may, for example, be implemented using the user's finger or using a stylus. Other selection options are possible. For example, the direction of the user's gaze may be determined so that selection can be implemented by looking at a portion of the relevant display. Other options include voice commands and keyboard or mouse instructions. Touching a display screen, using the direction of the user's gaze, voice commands and using a keyboard or mouse are all examples of user indications. A subset of user indications are user gestures (e.g. hand gestures) that could be used as a form of user input in some embodiments. A further option for determining an object or area of interest includes making use of content analysis (e.g. matching the content of a view with known content and tracking that content). Content analysis may be combined with other elements. For example, a user may indicate an area of interest and content analysis used to identify objects of interest within that region.

Not all of the operations of the algorithm 90 are essential. As indicated above, it may not be necessary to select both a front object or area (operation 88) and a rear object or area (operation 94). Furthermore, it may not be necessary to reframe the front view (operation 90) and/or the rear view (operation 96). In particular, reframing does not necessarily need to include a zooming operation.

It should be noted that at least some of the operations of the algorithm 90 may be carried out in a different order. For example, although the algorithm 90 describes operation 88 (the selection of the front object or area of interest) being carried out before operation 94 (the selection of the rear object or area of interest), these operations may be reversed.

Figure 10:
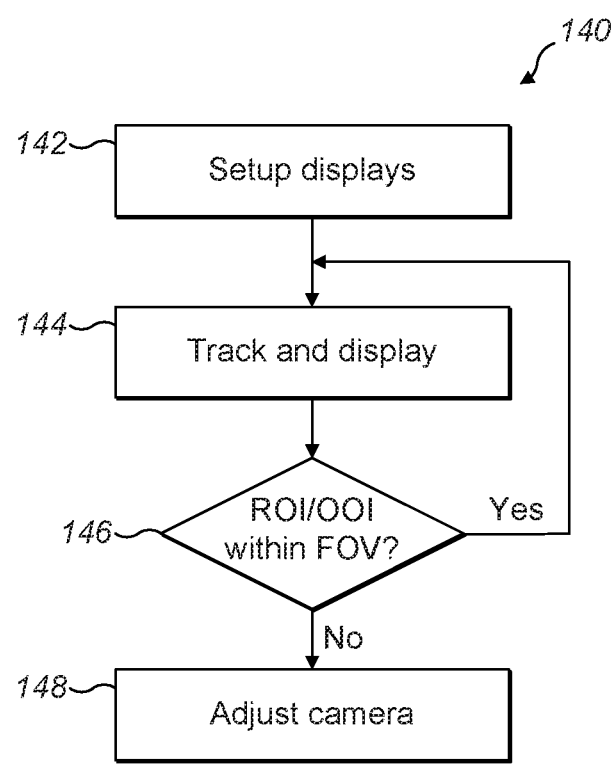
FIG. 10 is a flow chart showing an algorithm in accordance with an example embodiment.

FIG. 10 is a flow chart showing an algorithm, indicated generally by the reference numeral 140, in accordance with an example embodiment.

The algorithm starts at operation 142, where front and rear displays are setup. For example, the operation 142 may implement the algorithm 80 described above. Thus, with operation 142 complete, a first display of a combined display may display the zoomed image 64' and a second display of the combined display may display the zoomed image 67'. (Of course, as noted above, zooming and reframing is not essential in all embodiments.)

At operation 144, objects or areas that have been selected are tracked so that they are kept within the centre of the relevant display (e.g. within the centre of the relevant display). Thus, for example, as the user device 12 and/or the displayed objects 52 to 55 move, they can be retained within the centre of the displayed image. In the example display 130, both the objects 52 and 55 (corresponding to the images 64 and 67) may be tracked in the operation 144. This is possible since, as noted above, the fields of view of the front and rear cameras of the user device obtain more data than is shown in the display. As described further below, it is not always possible to keep the tracked area within the centre of the relevant display. The operation 144 may include keeping the tracked area within the relevant display (whether or not the tracked area is within the centre of that display). In some embodiments, the viewport may be moved within the field of view in order to keep the tracked area within the centre (or closer to the centre) of the relevant display.

It should be noted that it is by no means essential that two areas/objects of interest are selected. For example, in the case of the exemplary display 110, the third object 64 may be kept within the centre of the first display, but the user may be free to rotate the user device in order to change what is visible in the second display. In some example embodiments, the user has control of the selection (and de-selection) of areas/objects of interest.

Consider the example of the system 10 described above in which the first and second objects 15 and 16 are children and the third object 17 is a parent. The user of the user device may decide to track the children 15 and 16 manually by moving the user device 12. Thus, no object may be selected in operation 88 described above. However, the parent 17 may be selected in operation 94 such that the parent is tracked automatically. Thus, provided that the parent is within the field of view of the rear camera 14 of the user device 12, the parent will stay within the centre of the rear view 22. As indicated above, it may not be possible to keep the children 15 and 16 and the parent 17 within the centre of the fields of view of the relevant display. In some embodiments, the viewport of the relevant camera(s) may be moved within the field(s) of view in order to keep the tracked area(s) within the centre (or closer to the centre) of the relevant display.

At operation 146 of the algorithm 140, it is determined whether or not a region or object of interest remains within the field of view of the relevant camera. If so, the algorithm returns to operation 144; otherwise, the algorithm moves to operation 148.

At operation 148, it has been determined that at least one region or object of interest is no longer within the field of view of the relevant camera. Thus, it is not possible to display that region or object. This can be corrected, for example, by suitable rotation of the user device (such that the field of view of the relevant camera moves). Such rotation (or other movement) may be initiated in operation 148.

FIGS. 11a to 11e show different versions of an exemplary view output in accordance with an exemplary embodiment. Each of FIGS. 11a to 11e shows a first view 150 showing what is visible within a field of view and a viewport of the first camera 13, a second view 151 showing what is visible within a field of view and a viewport of the second camera 14, and a third view 152, which is a combined view derived from the contents of the viewports of the first and second views.

Figure 11A:
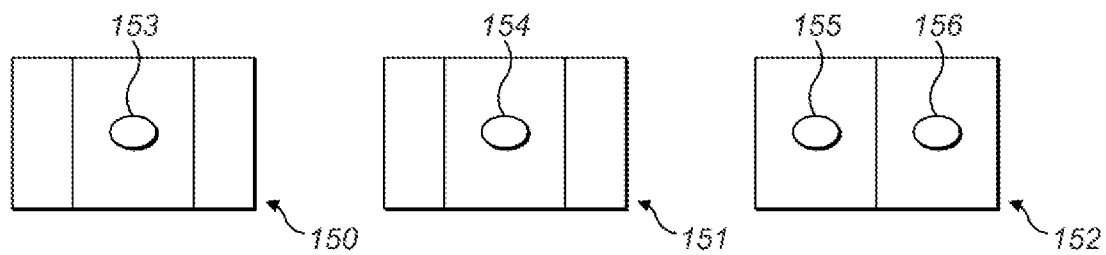
FIGS. 11a to 11e show exemplary outputs in accordance with an example embodiment.

In FIG. 11a, the first view 150 includes a first object 153 in the centre of the viewport. Similarly, the second view 151 includes a second object 154 in the centre of the viewport. Accordingly, the third view includes a first object 155 (corresponding to the first object 153) and a second object 156 (corresponding to the second object 154).

Assume that the first object 153 is being tracked (having been selected in the operation 88 described above), but that the second object 154 is not being tracked (so that no object or area was selected in operation 94). In accordance with operation 144 of the algorithm 140, the first object of interest will been tracked and kept within the centre of the relevant display 152.

Figure 11B:
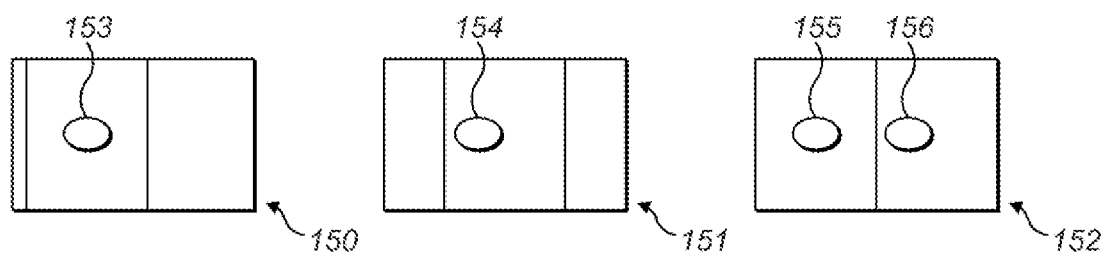

FIG. 11b shows the situation where both the first object 153 and the second object 154 move to the left within the relevant viewports. As shown in the first view 150, the first object 153 is being tracked, so the viewport for the first camera effectively moves within the field of view so that the first object 153 stays within the centre of the viewport. At the same time, the second object 154 is not being tracked, so the view of view of the second camera does not move (see the second view 151). Accordingly, the third view 152 shows the first object 155 in the centre of the relevant viewport and the second object 156 towards the left of the relevant viewport.

Figure 11C:
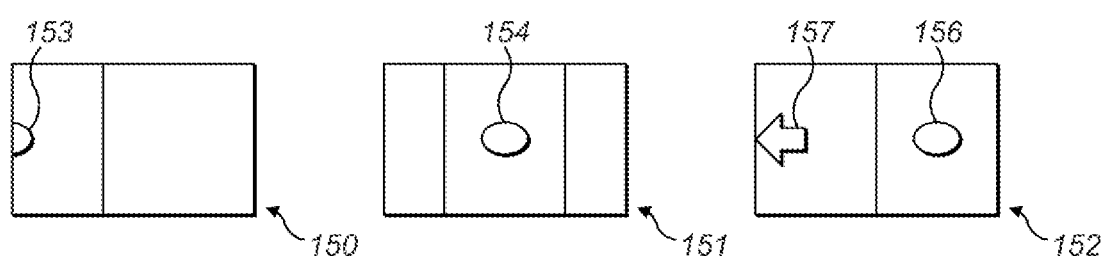

FIG. 11c shows the situation where the first object 153 is moving outside the field of view of the first camera (see the first view 150) and the second object has moved back to the centre of the viewport of the second camera (see the second view 151 and the third view 152, where the second object 156 is once again displayed in the centre of the relevant viewport). Since the object 153 has moved out of the field of view of the first camera of the user device 12, it is no longer possible to track and display that object in full. Accordingly, the algorithm 140 moves to operation 148, which causes an arrow 157 to be displayed (see the third view 152 of FIG. 11c). The arrow 157 indicates that the object 152 has moved out of the area visible to the relevant camera of the user device. The arrow 157 therefore prompts the user to rotate the user device, if they wish to continue to track the relevant object. The arrow 157 is an example of an alert that may be provided to indicate when the first region or object of interest and/or the second region or object of interest moves outside a field of view of the relevant camera. The arrow 157 is shown by way of example only; many alternative mechanisms could be used for indicated to the user that the tracked object/area is no longer within the field of view. These include visual indications (such as the arrow 156 or a flashing image), audio indications (e.g. an alarm) or haptics.

Figure 11D:
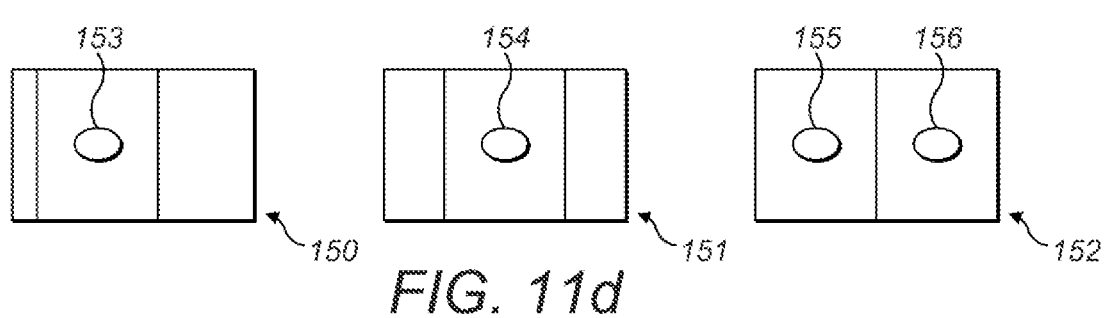

FIG. 11d shows the situation where the first object 153 has moved back within the field of view of the first camera (see the first view 150) and the second object is still in the centre of the viewport of the second camera (see the second view 151). Thus, both the first object 155 and the second object 156 can be displayed in the centre of the relevant viewport of the third view 152).

Figure 11E:
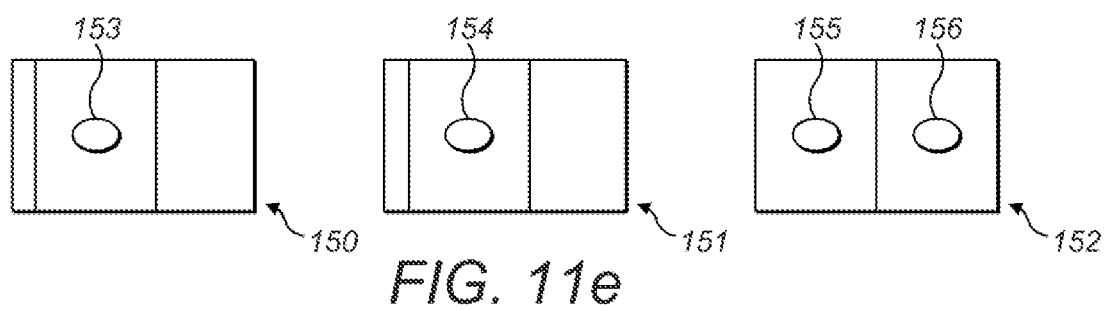

Assume now that both the first object 153 is being tracked (having been selected in the operation 88 described above) and the second object 154 is being tracked (having been selected in the operation 94 described above). FIG. 11e shows the situation where both the first object 153 and the second object 154 move to the left within the relevant viewports. As shown in the first view 150, the first object 153 is being tracked, so the viewport for the first camera effectively moves within the field of view so that the first object 153 stays within the centre of the viewport (in the same manner as described above with reference to FIG. 11b). At the same time, since the second object 154 is also being tracked, the viewport for the second camera effectively moves in a similar manner. Accordingly, as shown in the third view 153, both the first object 155 and the second object 156 appear in the centre of the relevant viewport.

Some of the embodiments described above include tracking an object of interest. This can be implemented in a number of ways. For example, a template may be generated identifying key features of an object being tracked (e.g. size, shape, colour, texture etc.) and a simple matching algorithm used to identify that object. In this way, it is possible to maintain an object within the centre of a viewport of the first or second camera described above.

Figure 12A:
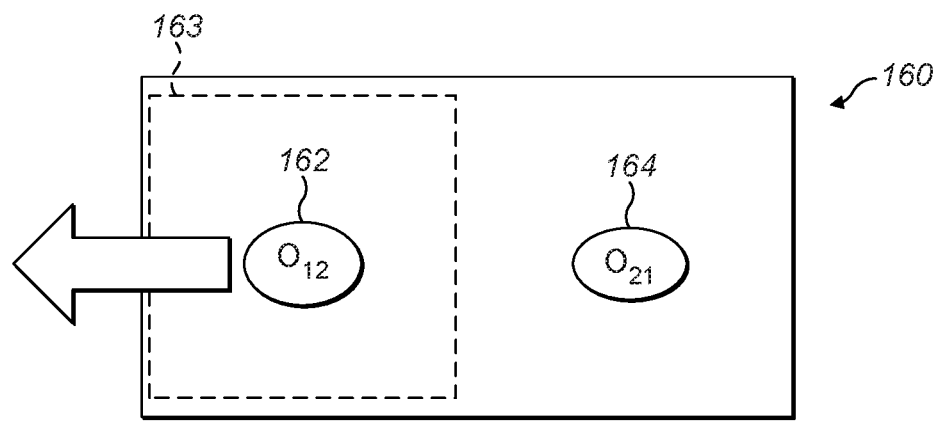
FIGS. 12a to 12c show exemplary outputs in accordance with an example embodiment.
Figure 12B:
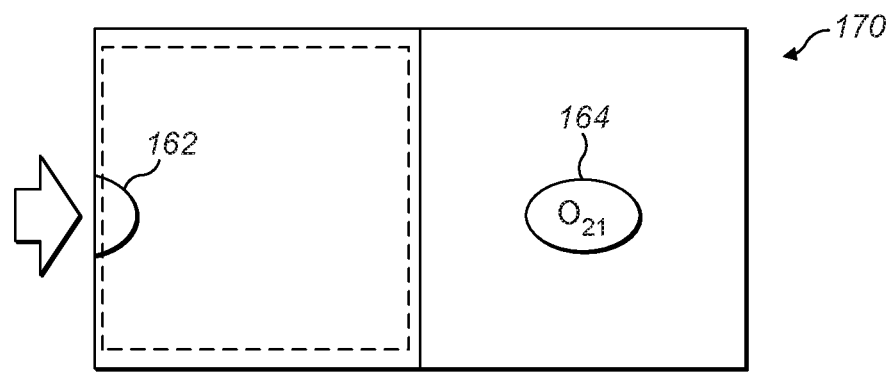
Figure 12C:
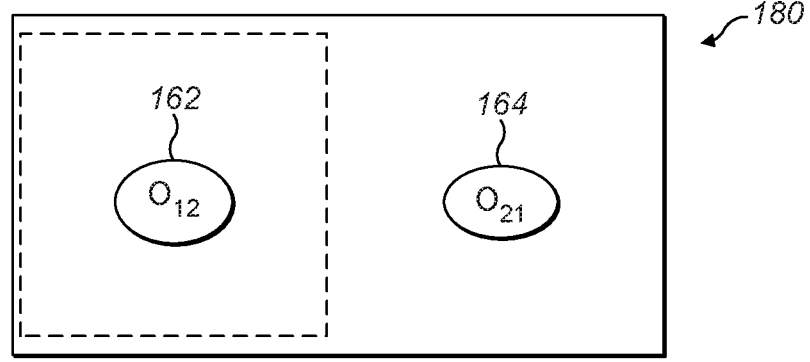

FIGS. 12a to 12c show exemplary outputs, indicated generally by the reference numeral 160, 170 and 180 respectively in accordance with an example embodiment.

FIG. 12a shows an arrangement 160 in which a first object 162 is being tracked (as indicated by the square box 163) and a second object 164 is not being tracked.

FIG. 12b shows the situation when the first object 162 moves out of the field of view of the relevant camera, but no action is taken in result. The object can no longer be tracked and so is seen to move out of the display.

Assume now that the object moves back into the field of view. Now, as shown in FIG. 12c, that object (the object 162) can once again be tracked and shown in the centre of the relevant display. As described above, a template may be generated identifying key features of an object being tracked (e.g. size, shape, colour, texture etc.) and a simple matching algorithm used to identify that object. It may be possible to use such a matching algorithm to identify such an object moving back within the field of view of a camera.

The embodiments described above have generally described an object of interest, which is tracked. It is also possible to track a region of interest, regardless of what is visible within that region. Thus an area of interest, for example selected by a user in any of the ways described herein, can be kept within the centre of a display, provided that area of interest remains within the field of view of the relevant camera.

Figure 13A:
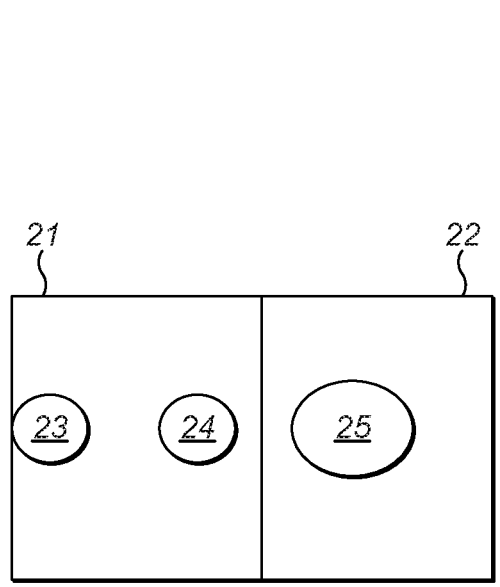
FIGS. 13a and 13b shows example outputs in accordance with example embodiments.

In the embodiments described above, the combined views have been presented side-by-side. This is not essential in all forms of the invention. FIG. 13a shows an exemplary view output by the system of FIG. 1 and is identical to FIG. 2 described above.

Thus, FIG. 13a is a combined view that includes a first view that is provided by the front camera 13 and a second view 22 that is provided by the rear camera 14. As shown in FIG. 2, the combined view 20 displays the first and second views side-by-side. The first view 21 includes a first image 23 (a representation of the first object 15) and a second image 24 (a representation of the second object 16). In a similar way, the second view 22 includes a third image 25 that is a representation of the third object 17.

Figure 13B:
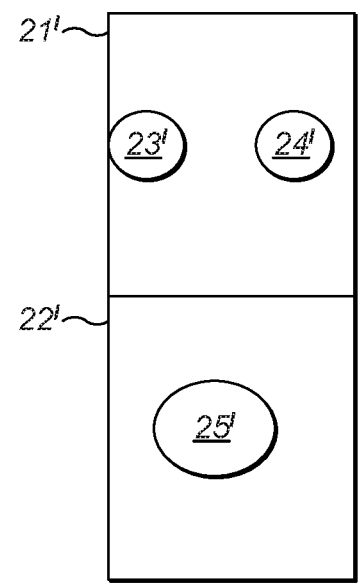

FIG. 13b also shows a combined view, including a first view 21' that corresponds to the first view 21 described above (and includes a first image 23' and a second image 24') and a second view 22' that corresponds to the second view 22 described above (and includes a third image 25'). The combined view of FIG. 13b differs from the combined view of FIG. 13a in that the first and second views are shown on top of one another. As shown in FIG. 13b, the first view 21' is displayed above the second view 22'. In alternative embodiments, the second view could be displayed above the first view.

Figure 14:
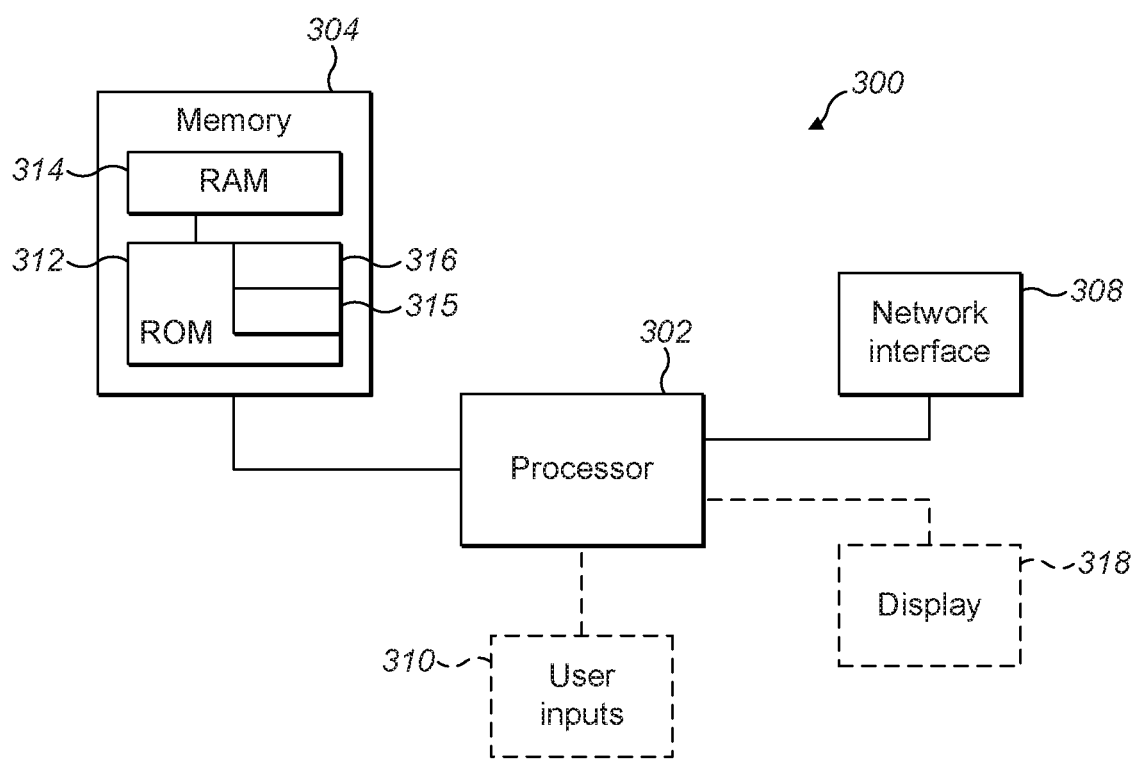
FIG. 14 is a block diagram of a system according to an example embodiment.

For completeness, FIG. 14 is an example schematic diagram of components of one or more of the modules described previously, in accordance with an example embodiment, which hereafter are referred to generically as processing systems 300. A processing system 300 may comprise a processor 302, a memory 304 closely coupled to the processor and comprised of a RAM 314 and ROM 312, and, optionally, user inputs 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 80 and/or 140.

The processor 302 may take any suitable form. For instance, it may be a microcontroller, plural microcontrollers, a processor, or plural processors.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there. The communication may be processed through the network interface 308.

Figure 15A:
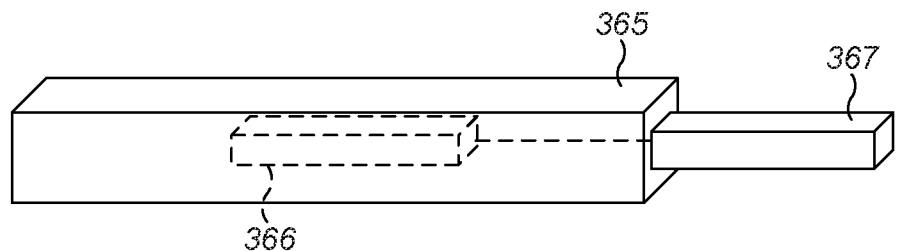
FIGS. 15a and 15b show tangible media, respectively a removable memory unit and a company disc (CD) storing computer-readable code which when run by a computer perform operations according to embodiments.
Figure 15B:
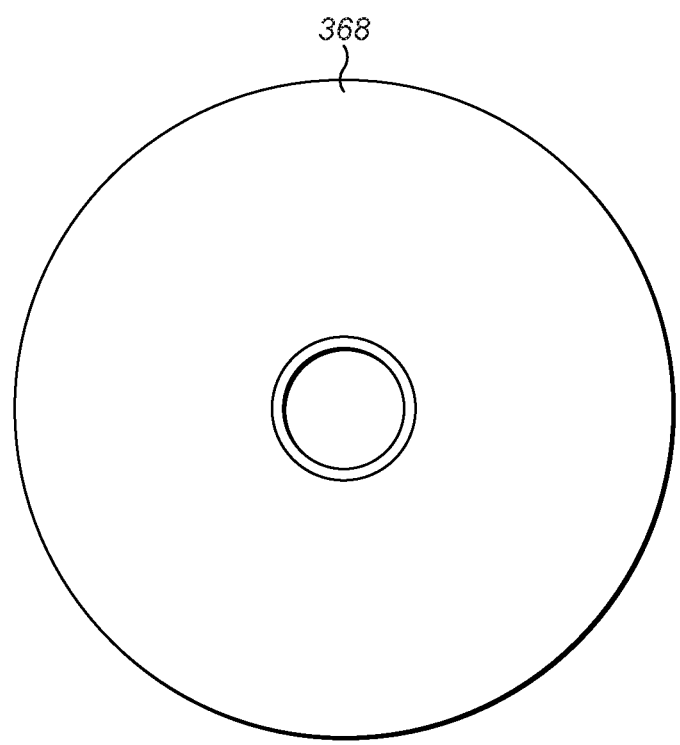

FIGS. 15a and 15b show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIGS. 8 and 10 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
at least one processor; and
at least one memory including computer program code;
the at least one memory and the computer program code configured to, with the at least one processor, cause the apparatus at least to perform:
obtaining first input data from a first camera of a multi-camera device, wherein the first input data is data from a field of view of the first camera;
obtaining second input data from a second camera of the multi-camera device, wherein the second input data is data from a field of view of the second camera and wherein the second camera is orientated in a different direction to the first camera;
defining a first region or object of interest for the first camera and a second region or object of interest for the second camera;
tracking the first region or object of interest while also tracking the second region or object of interest;
generating a first output data based on the first input data, wherein the first output data is data from a viewport of the first camera, wherein the viewport of the first camera depends on the tracking the first region or object of interest;
generating a second output data based on the second input data, wherein the second output data is data from a viewport of the second camera, wherein the viewport of the second camera depends on the tracking the second region or object of interest; and
generating a multi-camera output that includes the first and second output data,
wherein:
simultaneously, the viewport of the first camera is narrower than the field of view of the first camera and the viewport of the second camera is narrower than the field of view of the second camera; and tracking the first region or object of interest comprises keeping the first region or object of interest within the first output data and tracking the second region or object of interest comprises keeping the second region or object of interest within the second output data.

2. The apparatus as claimed in claim 1, wherein the first region or object of interest or the second region or object of interest is defined by a user indication.

3. The apparatus as claimed in claim 1, wherein the memory and computer program code, with the at least one processor, are further configured to cause the apparatus to cease to track the first region or object of interest or the second region or object of interest when the said region or object of interest moves outside a field of view of the relevant camera.

4. The apparatus as claimed in claim 3, wherein the memory and computer program code, with the at least one processor, are further configured to cause the apparatus to resume tracking of the first region or object of interest or the second region or object of interest when the said region or object of interest moves back within a field of view of the relevant camera.

5. The apparatus as claimed in claim 1, wherein the memory and computer program code, with the at least one processor, are further configured to cause the apparatus to provide an alert when the first region or object of interest or the second region or object of interest moves outside a field of view of the relevant camera.

6. The apparatus as claimed in claim 1, wherein the memory and computer program code, with the at least one processor, are further configured to cause the apparatus to deselect the first region or object of interest for the first camera or the second region or object of interest for the second camera and ceasing to track the deselected region or object of interest.

7. The apparatus as claimed in claim 1, wherein the multi-camera output is configured to present the first and second outputs data side-by-side.

8. The apparatus as claimed in claim 1, wherein the multi-camera output is configured to present the first and second outputs data one on top of the other.

9. The apparatus as claimed in claim 1, wherein the first camera is a front camera and the second camera is a rear camera.

10. A method, comprising:
obtaining first input data from a first camera of a multi-camera device, wherein the first input data is data from a field of view of the first camera;
obtaining second input data from a second camera of the multi-camera device, wherein the second input data is data from a field of view of the second camera and wherein the second camera is orientated in a different direction to the first camera;
defining a first region or object of interest for the first camera and a second region or object of interest for the second camera;
tracking the first region or object of interest while also tracking the second region or object of interest;
generating a first output data based on the first input data, wherein the first output data is data from a viewport of the first camera, wherein the viewport of the first camera depends on the tracking the first region or object of interest;
generating a second output data based on the second input data, wherein the second output data is data from a viewport of the second camera, wherein the viewport of the second camera depends on the tracking the second region or object of interest; and generating a multi-camera output that includes the first and second output data, wherein:
simultaneously, the viewport of the first camera is narrower than the field of view of the first camera and the viewport of the second camera is narrower than the field of view of the second camera; and tracking the first region or object of interest comprises keeping the first region or object of interest within the first output data and tracking the second region or object of interest comprises keeping the second region or object of interest within the second output data.

11. The method as claimed in claim 10, wherein the first region or object of interest or the second region or object of interest is defined by a user indication.

12. The method as claimed in claim 10, further comprising ceasing to track the first region or object of interest or the second region or object of interest when the said region or object of interest moves outside a field of view of the relevant camera.

13. The method as claimed in claim 12, further comprising resuming tracking of the first region or object of interest or the second region or object of interest when the said region or object of interest moves back within a field of view of the relevant camera.

14. The method as claimed in claim 10, further comprising providing an alert when the first region or object of interest or the second region or object of interest moves outside a field of view of the relevant camera.

15. The method as claimed in claim 10, further comprising deselecting the first region or object of interest for the first camera or the second region or object of interest for the second camera and ceasing to track the deselected region or object of interest.

16. The method as claimed in claim 10, wherein the multi-camera output presents the first and second outputs data either side-by-side or one on top of the other.

17. A computer program embodied on a non-transitory computer-readable medium, said computer program comprising computer-readable code which, when executed by at least one processor, causing performance of:
obtaining first input data from a first camera of a multi-camera device, wherein the first input data is data from a field of view of the first camera;
obtaining second input data from a second camera of the multi-camera device, wherein the second input data is data from a field of view of the second camera and wherein the second camera is orientated in a different direction to the first camera;
defining a first region or object of interest for the first camera and a second region or object of interest for the second camera;
tracking the first region or object of interest while also tracking the second region or object of interest;
generating a first output data based on the first input data, wherein the first output data is data from a viewport of the first camera, wherein the viewport of the first camera depends on the tracking the first region or object of interest;
generating a second output data based on the second input data, wherein the second output data is data from a viewport of the second camera, wherein the viewport of the second camera depends on the tracking the second region or object of interest; and generating a multi-camera output that includes the first and second output data, wherein:

simultaneously, the viewport of the first camera is narrower than the field of view of the first camera and the viewport of the second camera is narrower than the field of view of the second camera; and tracking the first region or object of interest comprises keeping the first region or object of interest within the first output data and tracking the second region or object of interest comprises keeping the second region or object of interest within the second output data.

18. The computer program as claimed in claim 17, wherein the computer program, when executed by at least one processor, further causes ceasing to track the first region or object of interest or the second region or object of interest when the said region or object of interest moves outside a field of view of the relevant camera.

19. The computer program as claimed in claim 18, wherein the computer program, when executed by at least one processor, further causes resuming tracking of the first region or object of interest or the second region or object of interest when the said region or object of interest moves back within a field of view of the relevant camera.

* * * * *